July 1, 1958  B. N. WEBER  2,841,115
AUTOMATIC CHAIN TYPE LIVESTOCK FEEDER
Filed March 25, 1955  2 Sheets-Sheet 2
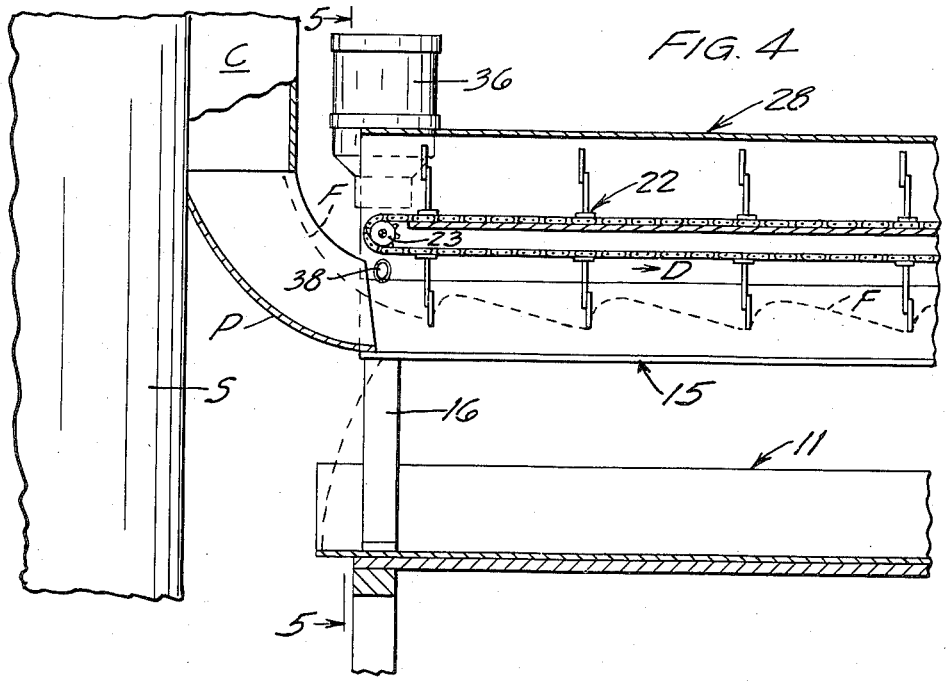
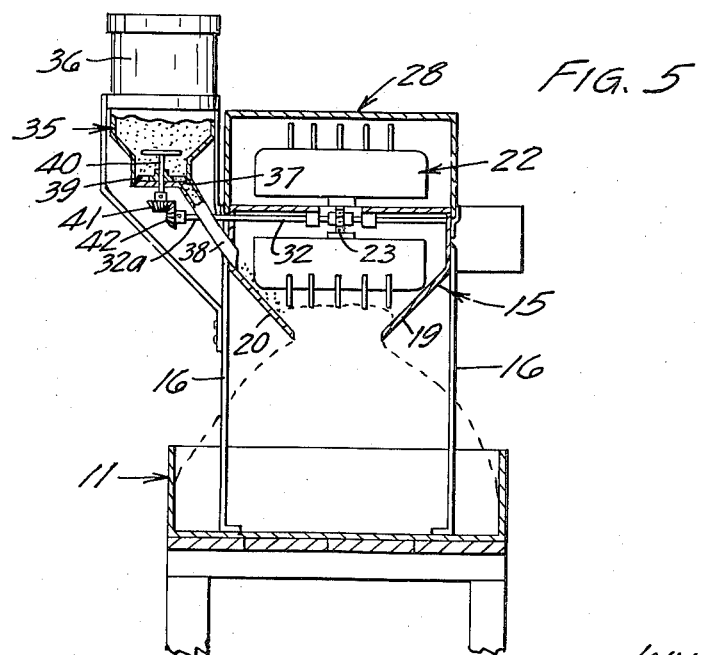
INVENTOR
BERTRAND N. WEBER
BY Williamson, Schroeder, Adams & Meyers
ATTORNEYS

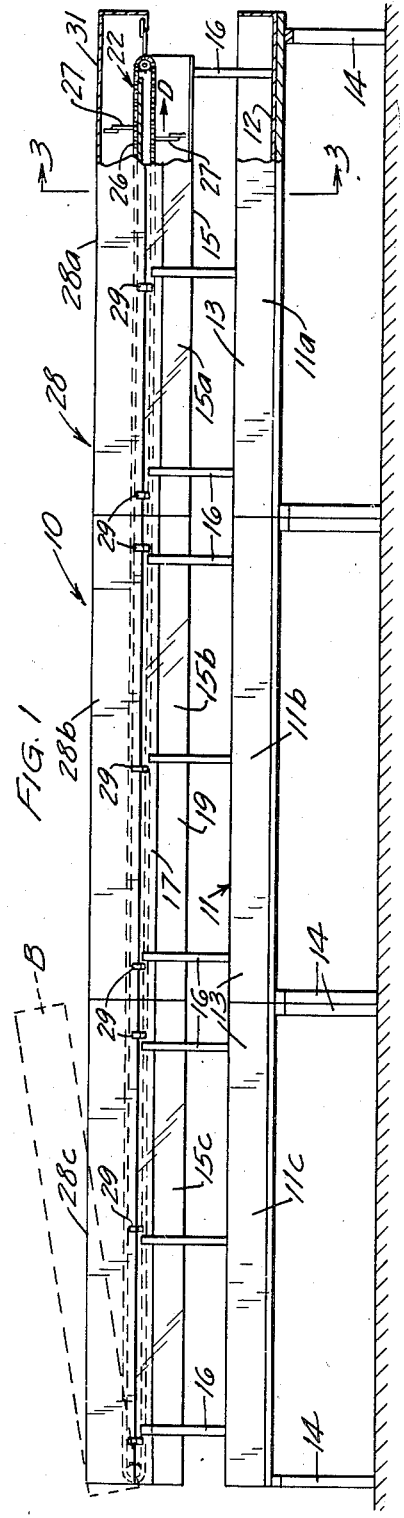

United States Patent Office 2,841,115
Patented July 1, 1958

2,841,115
AUTOMATIC CHAIN TYPE LIVESTOCK FEEDER

Bertrand N. Weber, Green Isle, Minn.

Application March 25, 1955, Serial No. 496,710

3 Claims. (Cl. 119—52)

This invention relates to bunker type feeders and more specifically relates to feeding apparatus for carrying and spreading feed over an elongated bunker trough for providing feed for numerous head of livestock.

An object of my invention is the provision of a bunker feeder of relatively simple and inexpensive construction and operation having apparatus for carrying and spreading livestock feed such as silage and the like, uniformly throughout the length of the feeder trough from which livestock may eat without damaging the feeder or injuring themselves.

A further object of my invention is to provide an improved bunker feeder which carries and guides feed, such as silage, in such a manner to build an elongated pile of predetermined maximum size therein and which, when the pile is depleted at certain portions along the length thereof, will supply additional feed to those depleted portions without overloading the remainder of the pile or causing spilling of the feed onto the ground.

A further object of my invention is to provide an improved feeder of the class described to which additional sections may be readily and easily added for adapting the feeder for use by an increased number of head of livestock.

A still further object of my invention is the provision of a novel feeder of the class described which is adapted for outdoor use and which protects the feed and said conveying mechanism from the weather.

These and other objejcts and advantages of my invention will more fully appear from the following description made in connection with the accompanying drawings wherein like reference characters refer to the same or similar parts throughout the several views and in which:

Fig. 1 is a side elevation view of my invention shown partly in section;

Fig. 2 is a section view of my invention taken on a vertical plane extending longitudinally therethrough and substantially at 2—2 of Fig. 3;

Fig. 3 is a section view taken on a vertical plane substantially at 3—3 of Fig. 1;

Fig. 4 is a partial vertical section view similar to Fig. 2 of a modification of my invention; and Fig. 5 is a vertical section taken substantially at 5—5 of Fig. 4.

The feeder which is designated in general by numeral 10 includes an open topped elongated trough 11 which has a bottom 12 and confining side walls 13. The trough is formed of a plurality of similar sections 11a, 11b and 11c which are suitably mounted by support frames 14 off the ground and in alignment with each other. The feeder 10 will be positioned in a livestock pen with one end of the trough thereof in proximity with the conventional silo wherein livestock feed is stored.

An elongated housing or enclosure 15 is mounted in spaced relation above trough 11 and extends longitudinally substantially throughout the length thereof and is supported by a suitable support frame 16. Housing 15 is also formed of a plurality of interconnected sections 15a, 15b and 15c. Housing 15 is provided with side walls 17 and a top wall 18 and is also provided with a hopper-type bottom portion which is formed of a pair of inclined panels 19 and 20 which define an elongated opening 21 therebetween which is centrally disposed above trough 11. An elongated conveyor indicated in general by numeral 22 is also supported by support frame 16 and is provided with a pair of rotary guides or sprocket wheels 23 mounted at the opposite ends of the housing 15 and suitably journalled for rotation. One of the sprockets is affixed to a shaft 24 which extends through the housing side wall and to a source of rotary power 25 which may comprise a conventional electric motor and suitable speed-reducing gear mechanism and which may be substantially totally enclosed for protection from the weather and from damage by the livestock. Of course a suitable gear train or V-belt power transfer mechanism might be provided if it were desired to mount the source of power below trough 11.

Conveyor 22 also includes a single elongated flexible element or roller chain 26 mounted on sprockets 23 and having one run thereof extending through housing 15 and having the other run thereof disposed externally of housing 15 and slidably supported on the top wall 18. A plurality of toothed paddles 27 or rakes are secured in spaced relation with each other to chain 26 to move therewith about its course of travel. Rakes 27 depend from the run of chain 26 which passes through housing 15 and extend into slidable engagement with the hopper bottom panels 19 and 20 of housing 15 to be supported thereby as well as by chain 26. Chain 26 is comprised of a plurality of elongated sections which may be easily and readily inserted and removed.

A removable cover 28, which is constructed of a plurality of aligned sections 28a, 28b and 28c, is mounted on housing 15 and is supported by flange elements 29. Cover 28 is constructed of a pair of upstanding side walls 30 which overlap the side walls 17 of housing 15 and a top panel 31 interconnected between the side panels 30 to enclose the upper run of conveyor 22 therein. One of the sections, as 28c of cover 28, is swingably attached to housing 15 and in the form shown, is mounted on sprocket shaft 32 for relative rotation therewith, which shaft carries one of the sprockets 23. The top panel 31 of cover section 28c is disposed from pivot 32 a distance substantially equal to the distance between pivot 32 and the inclined panels 19 and 20. Cover section 28c may thereby be swung about its pivotal connection to housing 15 into inverted position to provide a chute for supplying feed into the hopper bottom of housing 15 from the supply of feed in a silo, to one end of the feeder 10.

In operation, cover section 28c will be swung from the full line position of Fig. 1 through the dotted line position B thereof, to the full line position as shown in Fig. 2 to provide a chute for supplying feed to the hopper bottom of housing 15 and to conveyor 22. The feed, as indicated by dotted line F of Fig. 2 is supplied in such a position that when conveyor 22 travels in the direction of arrow D the rakes 27 will gather feed from the chute and carry it through housing 15 and along the hopper bottom thereof. Paddles 27 will move freely over and be guided by panels 19 and 20 of housing 15. As the feed is carried through the hopper bottom of housing 15 the feed will fall through the elongated opening therein onto trough 11 to build a pile of feed therein confined by side walls 13, until the pile of feed builds up to the lower edges of panels 19 and 20 whereupon the feed will be carried a further distance through housing 15 to be deposited onto trough 11 through a different portion of the elongated opening 21. By this process an elongated pile of feed will be deposited in trough 11, and the maximum size of the pile will be predetermined by the relative positions of the trough side walls and the panels 19 and 20. When the full length of troughs 11 has been filled with feed the conveyor will be stopped. As portions of the feed along the length of the pile thereof are eaten away, the pile will be replenished by any feed which remains within housing 15. Cover section 28c will thereafter be swung over the upper run of conveyor 22 to protect the same from the weather and to protect the pile of feed from the weather.

When a portion of the pile of feed has been depleted feed may be again supplied through chute 28c into the housing hopper bottom and conveyor 22 will carry feed throughout the housing and the feed will be supplied only to those portions of the pile which are depleted and no feed will be added to those portions of the pile of feed which are not depleted, so there will be no spilling of feed onto the ground.

The feed conveyor 22 will return through its upper run after the feed carried thereby has been discharged through the opening in housing 15 and will not be in exposed relation wherein livestock may interfere with operation of the conveyor.

When it is desired to lengthen the feeder 10 for feeding an increased number of livestock, additional sections of trough 11, housing 15, conveyor 22 and cover 28 may be inserted into the mid section of the feeder. The feeder will thereby be flexible for use with any number of livestock.

In the form of the invention shown in Figs. 4 and 5 the structure is substantially identical to that shown in Figs. 1 through 3 and includes the trough 11, housing 15, removable cover 28, conveyor 22 which travels in the direction of arrow D and the support frame 16. The receiving end of the conveyor is shown adjacent a silo S having a discharge chute C and a deflector plate P which guides silage from the chute C into the receiving end of the conveyor.

A feed supplement metering mechanism indicated in general by numeral 35 is mounted on the support frame 16 adjacent the receiving end of conveyor 22. An enclosure or hopper 36 is provided for storing a supply of feed supplement, which is generally in a granular form. The enclosure 36 has an opening 37 at the lower portion thereof which communicates with a tube 38 to provide delivery means for carrying the feed supplement into housing 15. Tube 38 extends through the upright side wall of housing 15 above the inclined interior surfaces of panel 20. The feed supplement metering mechanism includes a rotary measuring element 39 which has a plurality of openings at the periphery thereof for permitting feed to pass therethrough when the openings are aligned with the discharge opening 37 of enclosure 36. The rotary measuring element is mounted on a shaft 40 which is journalled in suitable bearings mounted in enclosure 36 and which has a bevel gear 41 secured on the lower end thereof. Shaft 32 which is journalled in housing 15 and which carries the sprocket 23 is provided with an extension portion 32a which extends outwardly of housing 15 and has a bevel gear 42 thereon which is meshed with gear 41 for rotating the same when shaft 32 is rotated. The metering mechanism 35 will permit feed supplement to be discharged through the tube 38 only when the measuring element 39 is rotated. When conveyor 22 is rendered operative, shaft 40 and measuring element 39 will be rotated in synchronism with the conveyor to cause predetermined portions of feed supplement to be added to the feed carried by conveyor 22. As the feed F is dragged along on the panels 19 and 20 the feed supplement will become mixed therewith and the feed supplement will be discharged along with the silage through the opening between panels 19 and 20.

It will be seen that I have provided livestock feeding apparatus capable of flexible operation for use in various types of farming and which will permit efficient usage of the feed because the same is always maintained within a certain predetermined maximum sized pile in the trough and no feed will be permitted to fall onto the ground.

It will also be seen that I have provided livestock feeding apparatus which will carry and supply livestock feed such as silage into a trough to form an enlarged mound of feed therein and which will add predetermined portions of feed supplement to the silage and will mix such supplement therewith as the silage is being conveyed for deposit onto the trough.

It will, of course, be understood that various changes may be made in the form, detail, arrangement and proportion of the parts without departing from the scope of my invention which consists of the matter described herein and set forth in the appended claims.

What I claim is:

1. A livestock feeder for use with feed of the type which is likely to agglomerate into clumps such as silage, chopped hay and the like, said feeder comprising an elongated feed-confining trough, a supporting frame, a pair of elongate and parallel upright walls on the frame and extending horizontally along the trough and in spaced relation thereabove, the walls having lower feed-carrying panel portions sloped downwardly in converging relation and defining an elongated feed-discharge opening between the lower edges thereof, a conveyor mounted on the frame above said opening and extending longitudinally of the walls, said conveyor including an elongated endless flexible element having a plurality of transversely disposed feed-conveying flights thereon, each of said flights having a plurality of depending teeth thereon for dragging feed along the panels, said flights and teeth being disposed in overlapping and upwardly spaced relation with the downwardly convergent panels to permit the flights and teeth to move in multiple horizontal and vertical directions for dragging feed along the sloped panels and disintegrating the clumps carried therealong.

2. A livestock feeder for use with feed of the type which is likely to agglomerate into clumps such as silage, chopped hay and the like, comprising an elongated feed-confining trough, a supporting frame, a pair of elongate and juxtaposed feed-carrying and guiding panels on the frame and extending horizontally along the trough and in spaced relation thereabove, said panels being convergently sloped in a downward direction and defining an elongated opening between the lower edges thereof, a conveyor mounted on the frame above said opening and extending longitudinally of the panels, said conveyor including an elongated endless flexible element having a plurality of feed-conveying flights thereon, each of said flights having a plurality of depending teeth dragging feed along the panels for discharge through said opening and onto the trough to build a mound of feed thereon, said flights and teeth moving with wrist-like action to move and drag agglomerated clumps of feed in multi-directions and thereby cause disintegration of the clumps.

3. A livestock feeder for use with feed of the type which is likely to agglomerate into clumps such as silage, chopped hay or the like, comprising an elongated feed trough, elongated confining means above the trough and extending longitudinally thereof, said confining means including a pair of transversely spaced feed-confining walls extending longitudinally of the trough and depending toward the trough to define a feed-discharging opening between the lower edges thereof for directing feed onto the trough to build a mound of feed along the trough up to the walls, a feed conveyor including a single elongated flexible element extending through the confining means and between said walls, and a plurality of flights extending transversely of said element and affixed thereto, said flights having depending teeth extending downwardly toward said opening for dragging feed between the walls and along the mound of feed in the trough, whereby when such feed is agglomerated into heavy clumps the teeth engage such clumps to turn and swing the flights with wrist-like action and cause the clumps to be dragged and rolled in longitudinal and transverse directions and to thereby gradually move and disintegrate the clumps.

References Cited in the file of this patent

UNITED STATES PATENTS

| | | |
|---|---|---|
| 691,439 | Campbell | Jan. 21, 1902 |
| 1,186,444 | Schuchardt | June 6, 1916 |
| 2,311,747 | Gooch | Feb. 23, 1943 |
| 2,522,449 | Inman | Sept. 12, 1950 |
| 2,571,490 | Sanders et al. | Oct. 16, 1951 |
| 2,591,609 | Roberts et al. | Apr. 1, 1952 |
| 2,681,639 | Littlefield | June 22, 1954 |
| 2,738,766 | Hart | Mar. 20, 1956 |

OTHER REFERENCES

Automatic Poultry Feeder Plan, The Pennsylvania State College School of Agriculture, Agricultural Experiment Station, Progress Report No. 2, September 1948.

The Buckeye E-Z Automatic Poultry Feeder, August 1950.